Figure 1:
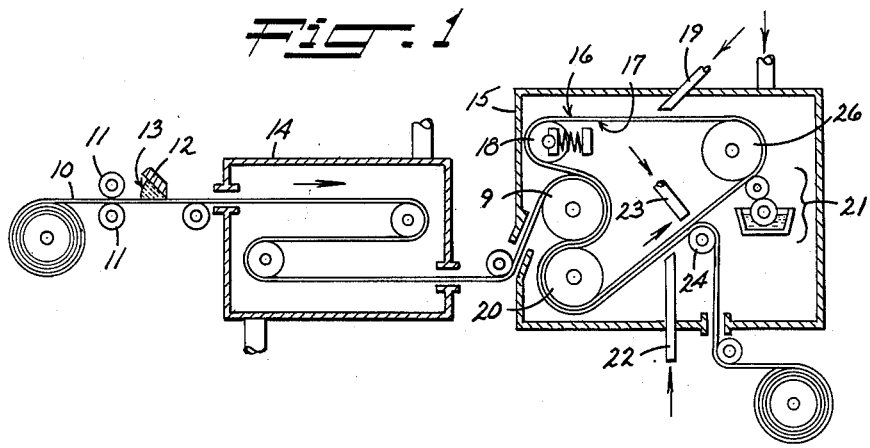

March 17, 1953     C. S. FRANCIS, JR     2,631,958

TRANSFER PROCESS FOR COATING MATERIALS

Filed Jan. 7, 1948

INVENTOR.
CARLETON S. FRANCIS, Jr

BY

Thomas R. O'Malley

ATTORNEY.

Patented Mar. 17, 1953

2,631,958

UNITED STATES PATENT OFFICE 2,631,958

TRANSFER PROCESS FOR COATING MATERIALS

Carleton S. Francis, Jr., West Harwich, Mass., assignor to American Viscose Corporation, Wilmington, Del., a corporation of Delaware Application January 7, 1948, Serial No. 1,019

2 Claims. (Cl. 154—97.5)

The present invention relates to the coating of material, and, more particularly, it relates to a process by which articles or materials may be coated with a film of organic film-forming material, which term includes thermoplastic and thermosetting material, and to the product thereof.

In the coating of textiles and the like with materials of the type of resins, the usual procedure is to spread the material in a paste-like condition on to the surface of the textile by the use of a spreading knife, generally called a doctor blade. The paste usually consists of a resin, a plasticizer, and a solvent. By this method, if a continuous impervious coating is desired, it is necessary to apply a multiplicity of coats (generally at least five or six), and the goods must be dried between each coat in order to evaporate the solvent. As an alternative procedure, the paste may be applied to the fabric by means of calender rolls. If the machine is not provided with a solvent recovery system, these procedures are wasteful and expensive, and, in any event, coating equipment is required which is not conventional equipment in a textile finishing plant. In these processes, it is necessary to use a substantial amount of coating material which tends to stiffen the fabric and precludes the preparation of a thin, flexible, impermeable film on the surface thereof. Furthermore, it is generally necessary in those cases where it is desirable to prevent the resinous material from penetrating the fabric, to treat the fabric with a preliminary filling agent and this agent also tends to stiffen the fabric.

A similar process has been utilized in which the resin has been spread in the form of a water-emulsion, but in this process also it has been necessary to apply a plurality of coats with a drying operation between each coat. In this instance, the drying step must free the product of the water in the emulsion, and hence the drying steps are much slower than in the process first described and cannot be conducted at relatively high temperatures without causing the resin in the emulsion to flow and consequently impregnate the fabric, with the result that a stiff and papery product is obtained. In this process also the use of filling material is generally employed.

In the processes described, rubber latex has been employed as the filling material, and while the use of this material produces a product which is less stiff than that obtained using a clay, starch or casein filler, the product has an appreciable stiffness. Furthermore, the use of the rubber latex filler, as is the case with the use of the other fillers, eliminates the possibility of making the fabric impermeable by the use of a very small amount of material.

In another process, a preformed self-supporting continuous film of synthetic resin is placed upon the surface of the textile material and adhered thereto by the use of a solvent or adhesive. This method has been limited to the production of artificial leather for use in the manufacture of shoes and the like, and thin films cannot be applied to produce a product of inappreciably increased thickness.

In copending applications Serial Number 346,332 now Patent No. 2,353,717, issued July 18, 1944, and Serial Number 377,212 now abandoned, processes of applying a film of thermoplastic material to the surface of articles by a heat transfer step from a backing sheet are described. In these processes, a film of thermoplastic material, formed on the surface of a backing or transfer sheet which offers less adhesion to the film than the surface to be coated, is transferred to the surface of the article by the application of heat and pressure. The backing sheet is then stripped from the film. In application Serial Number 346,332, the use of thermoplastic films which are non-self-supporting is disclosed, whereas in application Serial Number 377,212, the use of normally self-supporting films is described.

In application Serial Number 341,450 now abandoned, a process is disclosed in which a film of thermoplastic material is applied to a movable band, the band is then brought into contact with the surface of the article to be coated and the film of thermoplastic material is transferred to the surface of the material by the application of heat and pressure. A novel apparatus for carrying out this process is also described in the application.

The processes of these applications provide a simple and expedient method of applying a film of thermoplastic material to the surface of articles and materials, and the coated products are not appreciably increased in stiffness or bulk by the processes. Thus it is possible by these processes to produce coated paper, fabric, and the like which are lighter and more flexible than those produced by the previously available methods. Furthermore, in accordance with the processes of applications Serial Numbers 346,332 and 377,212, the coating of fabrics and the like is readily accomplished by means of conventional equipment used in textile finishing operations and the use by the textile company of organic solvents with their accompanying hazards is avoided.

The process of the present invention possesses all of the advantage of the processes of the aforesaid copending applications, Serial Numbers 346,332, 377,212 and 341,450, and, as will hereinafter appear, overcomes certain limitations inherent in the practice of the subject matter of the said copending applications.

Thus, while the processes of the copending applications provide a continuous, impervious film of thermoplastic material on the surface of relatively smooth materials such as paper and the like, difficulties are encountered in the application of such a coating to relatively rough surfaces due to the tendency of the films to rupture upon the application of heat and pressure. For example, in the coating of textile materials where the surface is broken due to the coarseness of the threads or of the fibres, it has been found that films of the desired thinness tend to become ruptured during the heat and pressure step. This tendency to rupture is accentuated because of the fact that in heating the film to the extent necessary to obtain a satisfactory bond with the relatively rough surface, the softened thermoplastic material flows to some extent at least into the interstices of the fabric. These processes are restricted to the application of films of materials which become tacky under the conditions of heating since the rendering of such materials tacky is relied upon to bond the film to the material. Therefore, films of thermosetting material which do not become tacky under the conditions employed although advantageous in some instances, cannot be applied by these methods. Furthermore, in these processes the film of thermoplastic material must have a softening point appreciably below that at which the material to be coated is damaged and this precludes the application of a film of relatively high softening point, the use of which in some instances would be advantageous in order to provide a smooth coated surface which will not be deleteriously affected by the temperatures which may be encountered in its use.

Accordingly, one object of the present invention is to provide a process having the advantages of the processes of the aforesaid copending applications and by which a thin, continuous, impervious coating of organic film-forming material may be applied to an article or material having a relatively rough surface without danger of rupturing the film.

A further object of the invention is to provide a process by which a coating of organic film-forming material which is only rendered tacky at a relatively high temperature may be satisfactorily adhered to the surface of articles and materials.

Still another object is to provide a process by which articles and materials may be coated, if desired, with a film of thermosetting material which cannot be thermoplastically adhered to a surface.

Other objects, including the provision of a coated article of advantageous properties, will be apparent from a consideration of the specification and claims.

The process of the present invention is particularly applicable for the treatment of relatively rough-surfaced materials such as textile fabrics and felts to provide such materials with a continuous, impervious coating of organic film-forming material whether of relatively low or relatively high softening point or incapable of being rendered tacky by heat; and the invention will be described in connection with the treatment of textile fabrics. It is to be understood, however, that the process as described in connection with the treatment of textile fabrics is equally applicable for the treatment of relatively smooth-surfaced materials to provide them with a coating of thermoplastic or thermosetting material, and is especially suitable for use in the treatment of such materials where it is desired to coat such materials with a surface film which will not become tacky at relatively high temperatures that may be encountered in use.

Figure 2:
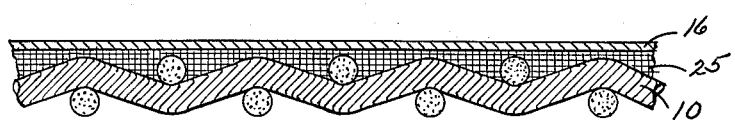

For a more complete understanding of the nature and objects of the invention, reference should be had to the accompanying drawing in which Figure 1 is a side elevation, partly in section, of suitable means for carrying out one embodiment of the process of the invention and Figure 2 is a cross-section of one embodiment of the product produced by the process illustrated in Figure 1.

In carrying out the process of the present invention, a film of organic film-forming material is transferred to the surface of the material, especially fibrous material, such, for example as textile fabric, absorptive paper or felt, from a backing sheet by the application of heat and pressure as described in the copending applications to which reference has been made, but in accordance with the present invention, thermoplastic material is interposed between the material and the continuous film of organic film-forming material. In the following detailed description, a textile fabric will be used as exemplary of the materials to be coated, but the invention is not limited to coating fabrics. The term "organic film-forming material" includes both thermoplastic and thermosetting materials. The term "thermoplastic material" as used herein with respect to the interposed material includes materials which are rendered tacky by heat in the process, irrespective of whether they are technically thermoplastic materials or whether they are convertible upon heat-treatment to an infusible material as is the case with thermosetting materials. This interposed thermoplastic material is referred to herein as a layer of thermoplastic material and this term includes both a continuous and a discontinuous layer of the material which may coat the surface wholly or only partially and fill at least partially the interstices of the fabric depending upon the nature of the surface and the heat treatment conditions.

The interposed layer of thermoplastic material impregnates the yarns and lays the nap and serves to fill at least to an appreciable extent the interstices of the fabric and to coat partially the surface of the fabric. Thus, the tendency of the film transferred from the backing sheet to become ruptured upon the application of heat and pressure due to the roughness presented by the coarseness of the threads of the fabric is overcome by the presence of the interposed thermoplastic material in the interstices and upon the surface of the fabric. In the case of smooth-surfaced materials, such as paper, the interposed thermoplastic material usually merely coats the surface of the material sufficiently to bond the continuous film thereto. The thermoplastic material interposed between the fabric and the continuous film is preferably of the type which will become tacky at an appreciably lower temperature than will the continuous film of organic film-forming material if, in fact, the film is capable of being rendered tacky by heat. The interposed thermoplastic material in this instance serves as a binding agent for the continuous film adhered to the backing sheet. In such a case, even if a continuous film of organic film-forming material is rendered tacky by heat, the presence of the interposed thermoplastic material, due to the fact that it becomes tacky at a lower temperature, permits a reduction in the heat and pressure used in the application of the film to the fabric. Furthermore, a film of relatively high softening point or one that does not become tacky by heat may be adhered to the fabric since the interposed thermoplastic material of lower softening point bonds the film to the fabric. It is to be understood that if the continuous film is capable of being rendered tacky by heat, the heat used may be sufficient to render the film tacky, in which case the bond with the fabric will be furnished by both the film and the interposed thermoplastic material. While, as above stated, the interposed thermoplastic material preferably becomes tacky at an appreciably lower temperature than will the continuous film of organic film-forming material, the thermoplastic layer may become tacky at (or approximately at) the temperature at which the continuous film became tacky, for example, where the layer of interposed thermoplastic material and the continuous film are made of different types of material or have different chemical or physical characteristics.

In the invention, the interposed thermoplastic material is applied to the fabric. In this method, the interposed thermoplastic material in flowable form, for example, as a viscous solution in an organic solvent or as a water-emulsion paste, preferably the latter, is applied to the fabric by any suitable means such as the conventional back-filling equipment. The viscous solution or emulsion paste may readily be applied to one or both of the surfaces of the fabric and, since the purpose of the application of the thermoplastic material is merely to impregnate the yarns, lay the nap, and fill partially the interstices of the fabric and to coat partially the surface fibres of the fabric, the material need not form a continuous film; in fact, in the usual application, the material will form a discontinuous coating. After the application of the thermoplastic material, the fabric is dried to evaporate the water or the solvent.

After the treated fabric has been dried, a continuous film of thermoplastic material prepared as described in copending applications Serial Numbers 346,332 or 377,212, or a thermosetting film may be applied to the fabric in the manner set forth in these applications. The continuous film adhered to a backing sheet, which presents less adherence to the film than the fabric, is placed on the surface of the treated fabric and sufficient heat and pressure are applied to cause the film to adhere to the treated fabric. The product is cooled and the backing sheet stripped from the film leaving it adhered to the surface of the fabric. In those cases where a thermosetting film is used, the film may be converted to the final stage by the heat and pressure treatment described, or by a subsequent treatment.

Referring to Figure 1, a web 10 of fabric is passed through the tension rolls 11 and under a doctor blade 12 by which the thermoplastic material 13 is applied to the web. The coated web is passed through the drier 14 where the coating is dried. The dried coated fabric then passes into the chamber 15 and over a roll 9 into contact with a thin film 16 of a thermoplastic material carried on the surface of an endless metal belt 17 passing over the rolls 18, 26, 9, and 20. The coating 16 is applied to the belt 17 as a solution in a volatile solvent by means of the coating unit 21, the solvent being evaporated while the belt moves under the air blast from the nozzle 19. The rolls 9 and 20 are heated so that the film 16 is caused to adhere to the coated surface of the web 10, thereafter the belt and web are cooled by means of the air blasts from the nozzles 22 and 23 and the web 10 carrying both the coating and film 16 is stripped from the belt 17 by means of the roll 24.

As shown in Figure 2, which is an enlarged cross-sectional view, the product comprises a web 10 of fabric carrying on one side a layer 25 of thermoplastic material which fills in the interstices of the fabric and provides a continuous substantially smooth surface to which is adhered a thin film 16 of organic film-forming material. In the absence of the intermediate layer 25, the film 16 would be broken and distorted by direct heat and pressure transfer to the fabric.

As disclosed in the copending applications, the backing sheet preferably is smooth and is prepared from a film-forming hydrophilic colloid such as a non-fibrous, hydrophilic cellulosic colloid, for example, cellophane. Another type of backing sheet that has been found to be satisfactory is paper which has been treated with a material such as wax so that it has less adhesion for the film than the material to be coated. When a smooth, glossy surface on the fabric is not desired, a backing sheet which has more or less a fibrous structure, such as highly beaten paper, may be used. The film of organic film-forming material transferred from the backing sheet may be of any desired thickness, that is it may be non-self-supporting or normally self-supporting, but in general the film will not exceed .002 inch in thickness. In many instances a very thin film, for example, a film of .0004 inch or less in thickness, will be applied.

The fabric preliminarily treated with the thermoplastic material may also, if desired, be processed on the apparatus and by the method disclosed in application Serial Number 341,450. In this case the thermoplastic material is applied to a movable band and hardened thereon in the form of a film of the desired thickness. The band is moved so that the film, while in position on the band, is brought into contact with the treated fabric. Heat and pressure are applied to adhere the film to the fabric and the film is stripped from the band. The movable band used in this process is included in the claims within the term "backing sheet."

As pointed out in the copending applications, the continuous film may be formed of any thermoplastic matter such as synthetic resins, for example, as the resins formed by the polymerization of various organic compounds such as cumarone, indene hydrocarbons, vinyl, styrene, sterols, aldehydes, furfural, ketones, urea, thiourea, phenol-aldehyde resins (either alone or modified with oils), urea-aldehyde resins, melamine-aldehyde resins, sulfonamide-aldehyde resins, polyhydric alcohol-polybasic acid resins; resins of the type disclosed in United States Patent No. 1,991,810; drying oil-modified alkyd resins, resins formed from esters of acrylic acid and methacrylic acid (its homologues and their derivatives), sulfur-olefine resins, resins formed from dicarboxylic acids and diamines (nylon type); synthetic or artificial rubber such, for example, as polymerized butadiene, olefine-polysulfides, e. g., "Thiokol," isobutylene polymers, chloroprene polymers and polyvinyl-halides, e. g., "Koroseal"; resins comprising the product of copolymerizing two or more resins, such for example, as copolymers of vinyl halide and vinyl acetate, copolymers of vinyl halide with an acrylic acid derivative, copolymers of vinyl compound and styrol compound; and also a mixture of resins, such, for example, as a mixture of vinyl resins and acrylic resins or methacrylate resins, a mixture of polyolefine resins and phenol-aldehyde resins, or a mixture of two or more resins from the different classes just named. Materials which can have limited thermoplastic properties imparted to them by the addition of plasticizers of well known type may also be used, such, for example, as derivatives of cellulose such as cellulose acetate, cellulose acetostearate, nitrocellulose, also alkyl, carboxy-alkyl and hydroxy-alkyl cellulose ethers of the types which are soluble in organic solvents; as well as natural and artificial gums which are thermoplastic. From some aspects of the invention, materials which are inherently thermoplastic, such as the resins previously mentioned, are preferred film-forming materials.

As hereinbefore stated, the continuous film on the backing sheet may be prepared from thermosetting material, rather than thermoplastic material, which may or may not pass through a tacky condition before it is converted into its infusible form. Any thermosetting film-forming material may be placed on the backing sheet, the use of thermosetting synthetic resins being preferred. Examples of thermosetting materials are the various types of phenol-formaldehyde resins, which term includes the resins made from phenol, cresol, xylenol or mixtures thereof with methylene-containing compounds such as formaldehyde, hexomethylenetetramine and the like; the so-called oil-soluble phenol-formaldehyde resins; thermosetting urea-formaldehyde resin, thermosetting alkyd resins, etc. If desired, an element-convertible resin (which becomes infusible through the action of certain elements such as oxygen and sulphur) may be used and such resins are included herein in the class of thermosetting resins. Examples of these resins are glycerolpolybasic acid-drying oil resins and olefine sulphur resins.

The thermoplastic material interposed between the fabric and the continuous film may also be any thermoplastic material, such as any of those truly thermoplastic materials mentioned above or any thermosetting material which becomes tacky by heat; but, as pointed out hereinbefore, this thermoplastic material will be rendered tacky at a temperature relatively lower than that at which the continuous film may be rendered tacky.

The film-forming material or the thermoplastic material, or both, may be plasticized with any one or a mixture of any of the well known plasticizers therefor commercially available. Such plasticizers are di-butyl phthalate, tri-cresyl phosphate and hexone.

In forming the continuous film on the backing sheet, the film-forming thermoplastic or thermosetting material may be dissolved in a suitable solvent which is reasonably volatile so that it can be evaporated at a relatively low temperature. For example, a copolymer of vinyl acetate and vinyl chloride may be dissolved in acetone or a mixture of toluol and butyl acetate. Any of the well known solvents for the film-forming materials previously mentioned may be used as well as mixtures of solvents.

The film-forming material, after being formed into a flowable composition of suitable viscosity by the use of suitable solvents and plasticized in any desired manner well known to those skilled in the art, is suitably applied to a backing sheet and hardened as by evaporating the solvents with air and/or heat.

The film-forming material may be applied to the backing sheet by coating, spraying, painting, knifing-on, or the like. The thickness of the film so applied may be suitably controlled by varying the viscosity of the film-forming solution as by varying the solid content of the solution and/or suitably controlling the temperature of the material at the point of formation of the film.

The amount of thermoplastic material comprising the layer interposed between the fabric and the continuous film of organic film-forming material is not critical, but sufficient is present in the case of the fabric to impregnate the yarns, lay the nap, fill the interstices of the fabric at least partially, and to coat partially the surface of the fabric so that the continuous film will not be ruptured when heat and pressure are applied. In the case of smooth surface materials, the thermoplastic material need only coat the surface of the material sufficiently to bond the film thereto. Normally, the amount of thermoplastic material employed is only sufficient to function as described, but larger amounts may be employed if desired, particularly when the thickness of the resulting product is not a consideration.

In applying the continuous film to the fabric, the thermoplastic material interposed between the fabric and the film is associated with the fabric, the backing sheet with the film in position thereon is placed in contact with the surface to be coated and heat and pressure are applied to cause the film to be transferred from the backing sheet to the surface, and the backing sheet is then stripped from the film.

The heat and pressure applied need only be sufficient to cause the interposed thermoplastic material to become tacky and to cause the film to adhere to the surface to be coated. The heat applied will be dependent upon the softening point of the interposed thermoplastic material and only moderate pressure is required, for example, a few pounds per square inch. If desired, higher pressures may be used, for instance, 500 pounds per square inch or higher. The pressure need only be applied for a short period of time and a few seconds or less will suffice, providing the heat is sufficient to cause the interposed thermoplastic material to become adhesive. The time and pressure conditions will be subject to variation to conform with the thermal conditions of the organic film-forming material as well as the thermal characteristics of the interposed thermoplastic material and the amount thereof present. The heat and pressure applied during the transfer process may be supplied by the use of heated platen plates of any well known type, heated calender rolls, steam presses, and the like.

The organic film-forming material may have any suitable pigment, filler and/or dyestuff incorporated therein to impart any degree of coloring and/or opacity desired to the film, and may also have moisture-proofing agents added thereto, such as waxes, oils and the like, if desired.

In the now preferred embodiment of the invention, thermoplastic synthetic resins are employed for both the continuous film and the interposed thermoplastic material, the resins being chosen with respect to the temperatures at which they become tacky, to give a product of the desired characteristics.

In one example, the continuous film is made of a resinous copolymer of vinyl acetate and vinyl chloride which does not become tacky until approximately 200° F. and the interposed thermoplastic material is resinous polyvinyl-acetate which becomes tacky at approximately 160° F. In this case the step of transferring the continuous film from the backing sheet is accomplished at a temperature slightly above 160° F., which is sufficiently low not to affect detrimentally the continuous film or the copolymer of vinyl acetate and vinyl chloride. The interposed thermoplastic material of the polyvinyl-acetate, as hereinbefore stated, is applied to the fabric. The application may be made by the use of a viscous solution of the resin in an organic solvent or of a water emulsion of the resin. When the resin is applied to the fabric it is preferably brought into contact therewith by means of a conventional back-filling machine and a water-emulsion containing 60% solids (resinous polyvinyl-acetate), thickened, if desired, to the proper consistency with gum tragacanth, is advantageously employed.

In another example, methyl methacrylate resin which becomes tacky at about 150° F. is used as the interposed thermoplastic material and a vinylidene chloride resin which does not become tacky until about 240° F. is employed as the continuous film on the backing sheet. In this case, the continuous film is applied to the fabric at a temperature in the neighborhood of 150° F. The use of a water emulsion of a methyl methacrylate resin (60% solids with a thickener if desired) with the interposed thermoplastic material is recommended.

In another example, where the continuous film is a thermosetting material, the continuous film comprises an organic solvent soluble thermosetting urea-formaldehyde resin in its heat-convertible stage of reaction, a latent acid catalyst e. g. chloracetic acid, and a plasticizer, and the interposed thermoplastic material is formed of an alkyd resin which becomes tacky at about 160° F. In this case, the step of transferring the continuous film from the backing sheet is accomplished at a temperature slightly above 160° F. During the transfer step or subsequently, the continuous film of urea-formaldehyde resin is converted by heating to 250° F. under a pressure of 150 lbs. per linear inch at the nip, to convert the resin to its final infusible form. Since the alkyd resin is also a thermosetting resin, the heat and pressure conditions employed will convert the intermediate layer of thermoplastic resin into its final infusible form.

Considerable modification is possible in the selection of the thermoplastic material employed as the interposed thermoplastic material and in the selection of the organic film-forming material forming the continuous film, as well as in the steps of the process, without departing from the essential features of the invention.

What I claim is:
1. A process for forming a flexible waterproof light weight coated fabric which comprises applying to one surface of a rough or porous fabric a thermosetting resin in a thermoplastic incompletely polymerized stage dissolved in an organic solvent, causing the solution to impregnate the fabric, evaporating the organic solvent to give a thermoplastic coating which fills at least in part the interstices in the fabric, impregnates the yarns, and lays the nap fibers on said surface of the fabric, thus reducing the porosity of the fabric and smoothing its surface, bringing a nonselfsupporting nonthermoplastic continuous film of organic plastic material supported on a temporary backing sheet into contact with the coated surface of said fabric, adhering the film to the coated surface by subjecting the film and coated surface to pressure and to heat sufficient to advance the polymerization of the thermosetting resin to a nonthermoplastic infusible stage, and stripping the backing sheet from the film, the coating upon the fabric preventing rupture of the film due to roughness of the fabric and anchoring the film to the fabric whereby the film tenaciously adheres to the fabric without cracking or peeling therefrom.

2. A process for forming a flexible waterproof light weight coated fabric which comprises applying to one surface of a rough or porous fabric a thermosetting resin in a thermoplastic incompletely polymerized stage dissolved in an organic solvent, causing the solution to impregnate the fabric, evaporating the organic solvent to give a thermoplastic coating which fills at least in part the interstices in the fabric, impregnates the yarns, and lays the nap fibers on said surface of the fabric, thus reducing the porosity of the fabric and smoothing its surface, bringing a nonselfsupporting continuous film comprising a thermosetting resin in a thermoplastic incompletely polymerized stage supported on a temporary backing sheet into contact with the coated surface of said fabric, adhering the film to the coated surface by subjecting the film and coated surface to pressure and to heat sufficient to advance the polymerization of the thermosetting resins to a nonthermoplastic infusible stage, and stripping the backing sheet from the film, the coating upon the fabric preventing rupture of the film due to roughness of the fabric and anchoring the film to the fabric whereby the film tenaciously adheres to the fabric without cracking or peeling therefrom.

CARLETON S. FRANCIS, Jr.

REFERENCES CITED

The following references are of record in the file of this patent:

UNITED STATES PATENTS

| Number | Name | Date |
|---|---|---|
| 1,694,258 | Hartong | Dec. 4, 1928 |
| 1,777,309 | Hopkinson | Oct. 7, 1930 |
| 2,169,288 | Reynolds | Aug. 15, 1939 |
| 2,205,557 | Fisher et al. | June 25, 1940 |
| 2,228,332 | Wick et al. | Jan. 14, 1941 |
| 2,274,706 | Keim | Mar. 3, 1942 |
| 2,306,046 | Duggan et al. | Dec. 22, 1942 |
| 2,353,717 | Francis et al. | July 18, 1944 |
| 2,404,073 | Karfiol et al. | July 16, 1946 |
| 2,430,934 | Kemmler et al. | Nov. 18, 1947 |
| 2,444,059 | Neher et al. | June 29, 1948 |
| 2,502,286 | Sowa | Mar. 28, 1950 |